(12) United States Patent
Kolar et al.

(10) Patent No.: US 9,514,256 B1
(45) Date of Patent: Dec. 6, 2016

(54) METHOD AND SYSTEM FOR MODELLING TURBULENT FLOWS IN AN ADVECTION-DIFFUSION PROCESS

(71) Applicant: International Business Machines Corporation, Armonk, NY (US)

(72) Inventors: Harry R. Kolar, Scottsdale, AZ (US); Noreen O'Brien, Waterford (IE); Fearghal O'Donncha, Galway (IE); Emanuele Ragnoli, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/962,046

(22) Filed: Dec. 8, 2015

(51) Int. Cl.
G06G 7/48 (2006.01)
G06F 17/50 (2006.01)
G06F 17/30 (2006.01)

(52) U.S. Cl.
CPC ..... G06F 17/5009 (2013.01); G06F 17/30424 (2013.01); G06F 17/30595 (2013.01)

(58) Field of Classification Search
CPC ............ G06F 17/5009; G06F 17/30595; G06F 17/30424
USPC ........................................................ 703/6
See application file for complete search history.

(56) References Cited

U.S. PATENT DOCUMENTS

| | | | |
|---|---|---|---|
| 5,801,969 | A | 9/1998 | Nagahama |
| 6,915,254 | B1 | 7/2005 | Heinze |
| 8,285,619 | B2 | 10/2012 | Herz |
| 8,756,040 | B2 | 6/2014 | Cruz |

(Continued)

FOREIGN PATENT DOCUMENTS

| | | |
|---|---|---|
| EP | 2237068 B1 | 10/2010 |
| WO | WO2014155330 A2 | 10/2014 |
| WO | WO2015017731 A1 | 2/2015 |

OTHER PUBLICATIONS

Carlson, K. D., et al. "GPGPU Accelerated Simulation and Parameter Tuning for Neuromorphic Applications" University of California, Irvine, CA 92697 (8 pages) Proceedings of the 19th Asia and South Pacific Design Automation Conference (ASP-DAC'14).
Demner-Fushman, Dina et al. "What can Natural Language Processing do for Clinical Decision Support?" J Biomed Inform. Oct. 2009 ; 42(5): 760-772.

(Continued)

*Primary Examiner* — Saif Alhija
(74) *Attorney, Agent, or Firm* — Cantor Colburn LLP; Kurt Goudy

(57) ABSTRACT

A computer-implemented method includes calculating, by a processor of a computer system, a value for a turbulent flow parameter in a simulated model comprising an initial turbulent flow scheme for an advection-diffusion process; determining, by the processor of the computer system, that the value for the turbulent flow parameter has exceeded a predetermined threshold; conducting, by the processor of the computer system, a search to identify search results for other turbulent flow schemes which match the value of the turbulent flow parameter; determining, by the processor of the computer system, a quantified level of information confidence for the search results; annotating, by the processor of the computer system, the search results with the quantified level of information confidence; and selecting, by the processor of the computer system, a new turbulent flow scheme corresponding to the search result having the highest quantified level of information confidence.

20 Claims, 3 Drawing Sheets

(56) References Cited

U.S. PATENT DOCUMENTS

| | | |
|---|---|---|
| 8,930,247 B1 | 1/2015 | Zhang |
| 9,046,881 B2 | 6/2015 | Blevins |
| 2008/0010023 A1* | 1/2008 | Vergassola .......... G05D 1/0274 702/19 |
| 2008/0071656 A1 | 3/2008 | Steuben |
| 2013/0024170 A1 | 1/2013 | Dannecker |
| 2014/0006012 A1 | 1/2014 | Zhou |

OTHER PUBLICATIONS

Antoniou, Constantinos, "On-line Calibration for Dynamic Traffic Assignment" Massachusetts Institute of Technology; Sep. 2004; 153 pages.

Pakhomov, Serguei, et al. "High throughput modularized NLP system for clinical text" ACLdemo '05 Proceedings of the ACL 2005 on Interactive poster and demonstration sessions pp. 25-28.

* cited by examiner

US 9,514,256 B1

METHOD AND SYSTEM FOR MODELLING TURBULENT FLOWS IN AN ADVECTION-DIFFUSION PROCESS

BACKGROUND

The present invention relates to modelling turbulent flows in an advection-diffusion process, and more specifically, to a computer-implemented method and system for modelling turbulent flows in an advection-diffusion process.

Many different turbulent flow models are used to simulate turbulent flows in advection-diffusion processes such as weather or oceanic conditions. Simulated advection-diffusion flow models utilize a designated turbulent flow scheme upon which the particular turbulent flow parameters of the model are based. A user inputs various turbulent flow parameters and selects a turbulent flow scheme to generate a simulation model of the turbulent flows in the advection-diffusion process being studied.

Model "drift" occurs when the turbulent flow parameters being modelled deviate from actual conditions due to non-linear interactions between initial conditions and the selected model parameters. Model drift thus reduces the accuracy of the simulated model. Due to the large-scale of atmospheric or oceanic advection-diffusion processes, as well as the many variables involved in modelling advection-diffusion processes, including fluctuations in turbulent flow parameters over time, selecting a turbulent flow scheme which matches the particular turbulent flow parameters (or conditions) being studied for simulation modelling can be quite challenging. The identification and selection, or tuning, of the appropriate turbulent flow scheme by a user to use as a model simulation can be tedious, complicated, time-consuming, costly and subject to user error.

Therefore, a need exists for a method of modelling turbulent flows in an advection-diffusion process which addresses one or more of these drawbacks.

SUMMARY

According to an embodiment, a computer-implemented method for modelling turbulent flows in an advection-diffusion process comprises calculating, by a processor of a computer system, a value for a turbulent flow parameter in a simulated model comprising an initial turbulent flow scheme for an advection-diffusion process; determining, by the processor of the computer system, that the value for the turbulent flow parameter has exceeded a predetermined threshold; conducting, by the processor of the computer system, a search to identify search results for other turbulent flow schemes which match the value of the turbulent flow parameter; determining, by the processor of the computer system, a quantified level of information confidence for the search results; annotating, by the processor of the computer system, the search results with the quantified level of information confidence; and selecting, by the processor of the computer system, a new turbulent flow scheme corresponding to the search result having the highest quantified level of information confidence.

According to another embodiment, a system for modelling turbulent flows in an advection-diffusion process comprises a memory; a processor communicatively coupled to the memory, wherein the processor is configured to perform: calculating a value for a turbulent flow parameter in a simulated model comprising an initial turbulent flow scheme for an advection-diffusion process; determining that the value for the turbulent flow parameter has exceeded a predetermined threshold; conducting a search to identify search results for other turbulent flow schemes which match the value of the turbulent flow parameter; determining a quantified level of information confidence for the search results; annotating the search results with the quantified level of information confidence; and selecting a new turbulent flow scheme corresponding to the search result having the highest quantified level of information confidence.

According to yet another embodiment, a computer program product for modelling turbulent flows in an advection-diffusion process comprises a non-transitory storage medium readable by a processing circuit and storing instructions for execution by the processing circuit for performing a method comprising: calculating a value for a turbulent flow parameter in a simulated model comprising an initial turbulent flow scheme for an advection-diffusion process; determining that the value for the turbulent flow parameter has exceeded a predetermined threshold; conducting a search to identify search results for other turbulent flow schemes which match the value of the turbulent flow parameter; determining a quantified level of information confidence for the search results; annotating the search results with the quantified level of information confidence; and selecting a new turbulent flow scheme corresponding to the search result having the highest quantified level of information confidence.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1A:
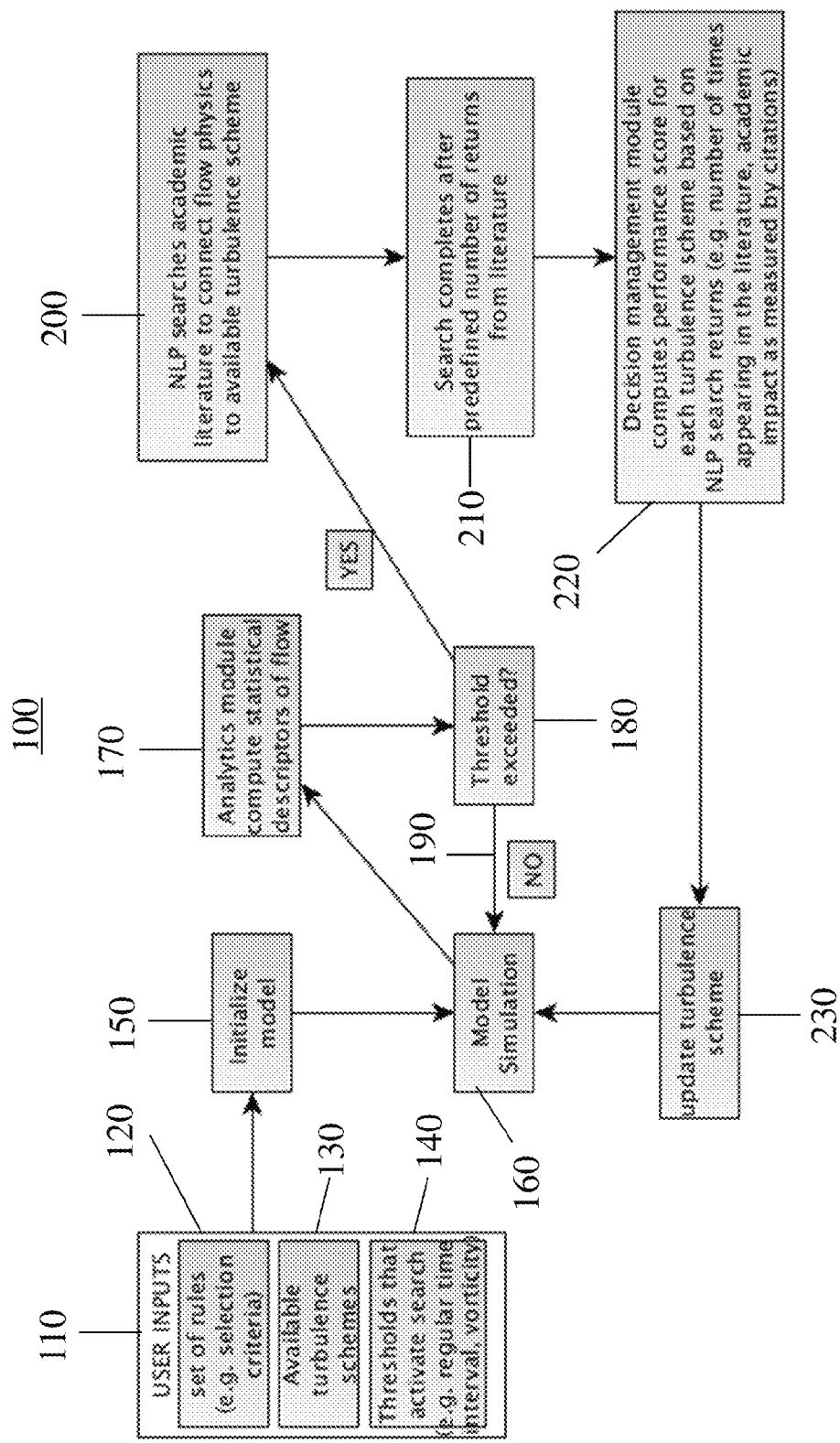
FIG. 1A is a flow chart of an embodiment of a computer-implemented method for modelling turbulent flows in an advection-diffusion process.

With reference now to FIG. 1A, a flow chart of an embodiment of a computer-implemented method 100 for modelling turbulent flows in an advection-diffusion process is shown. The process begins in step 110 by a user providing user inputs to select, by a processor of a computer system (not shown), one or more turbulent flow parameters of study 120, an initial turbulent flow scheme 130 and a threshold value 140 for one or more of the selected turbulent flow parameters based on information input by a user. Next, in step 150, a model simulation of an advection-diffusion process is initialized by the processor of a computer system. In step 160, an advection-diffusion model simulation comprising the selected initial turbulent flow scheme and the selected one or more turbulent flow parameters is generated by the processor of the computer system. In step 170, a value for the selected turbulent flow parameter of interest in the simulated model comprising the initial turbulent flow scheme for an advection-diffusion process is calculated by the processor of the computer system. In step 180, the processor of the computer system determines whether the value for the turbulent flow parameter is within or has exceeded the predetermined threshold.

In step 190, when the value of the selected turbulent flow parameter of interest in the simulated model comprising the initial turbulent flow scheme is within a predetermined threshold value for the selected turbulent flow parameter, the initial turbulent flow scheme in the model simulation is not updated. In step 200, when the value for the turbulent flow parameter has exceeded the predetermined threshold, a search to identify search results for other turbulent flow schemes which match the value of the turbulent flow parameter is conducted by the processor of the computer system. In step 210, the search is completed after a predetermined number of results are obtained. In step 220, a quantified level of information confidence for the search results is determined by the processor of the computer system and the computer system annotates the search results with the quantified level of information confidence. In step 230, a new turbulent flow scheme corresponding to the search result having the highest quantified level of information confidence is selected by the processor of the computer system. In step 160, the advection-diffusion model is updated with the new turbulent flow scheme and the model simulation continues with the updated turbulent flow parameters.

Figure 1B:
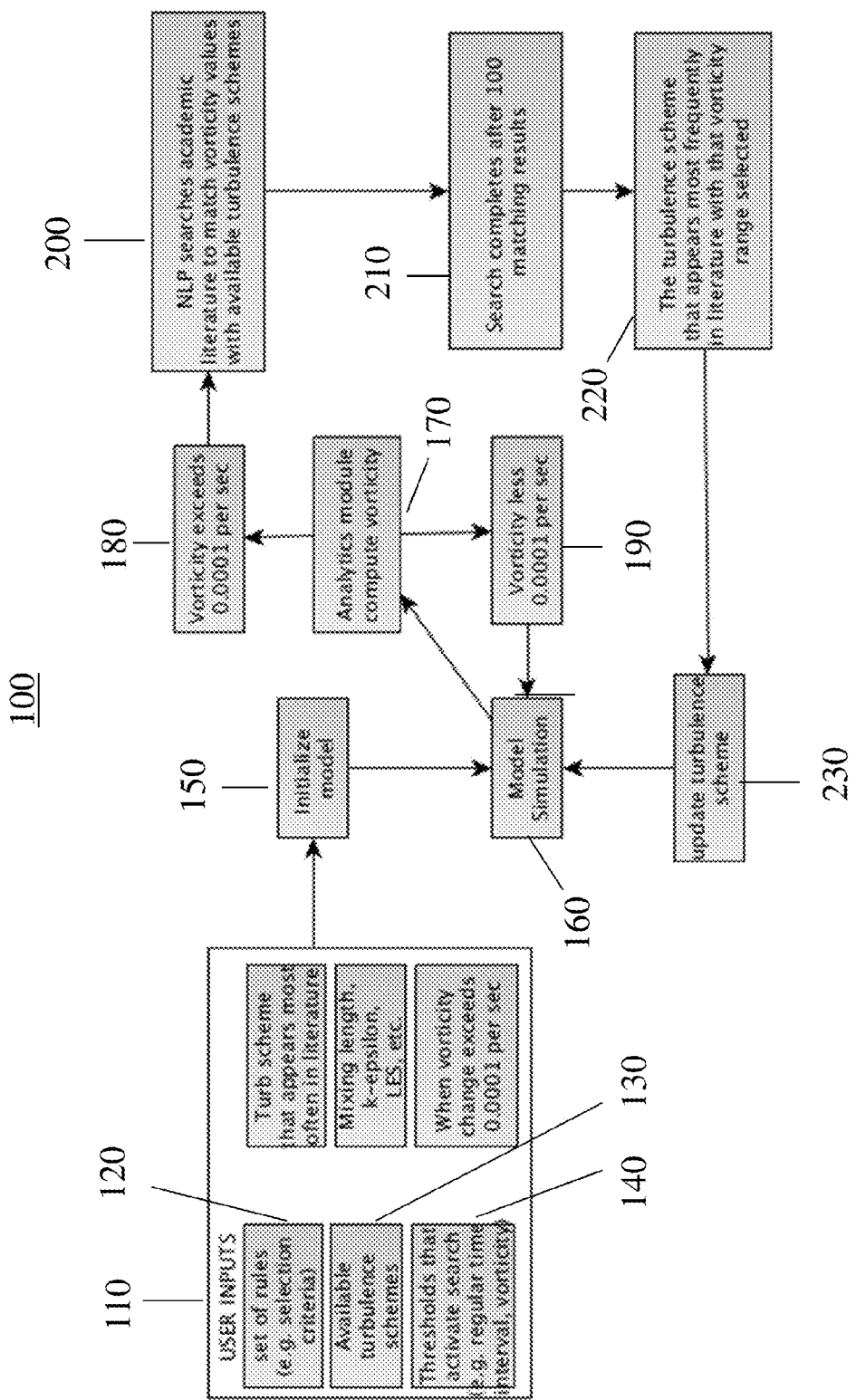
FIG. 1B is a flow chart of the computer-implemented method for modelling turbulent flows of FIG. 1 where the advection-diffusion process is that of an ocean.

Referring to FIG. 1B, a flow chart of the computer-implemented method for modelling turbulent flows of FIG. 1 where the advection-diffusion process is that of an ocean is shown, i.e., a large-scale advection-diffusion process. The computer-implemented method of FIG. 1B has the same general steps described herein with regard to FIG. 1A. As may be seen from FIG. 1B, in step 110, the turbulent flow parameter is vorticity and the predetermined threshold value for the vorticity is 0.0001 rotations per second.

Figure 2:
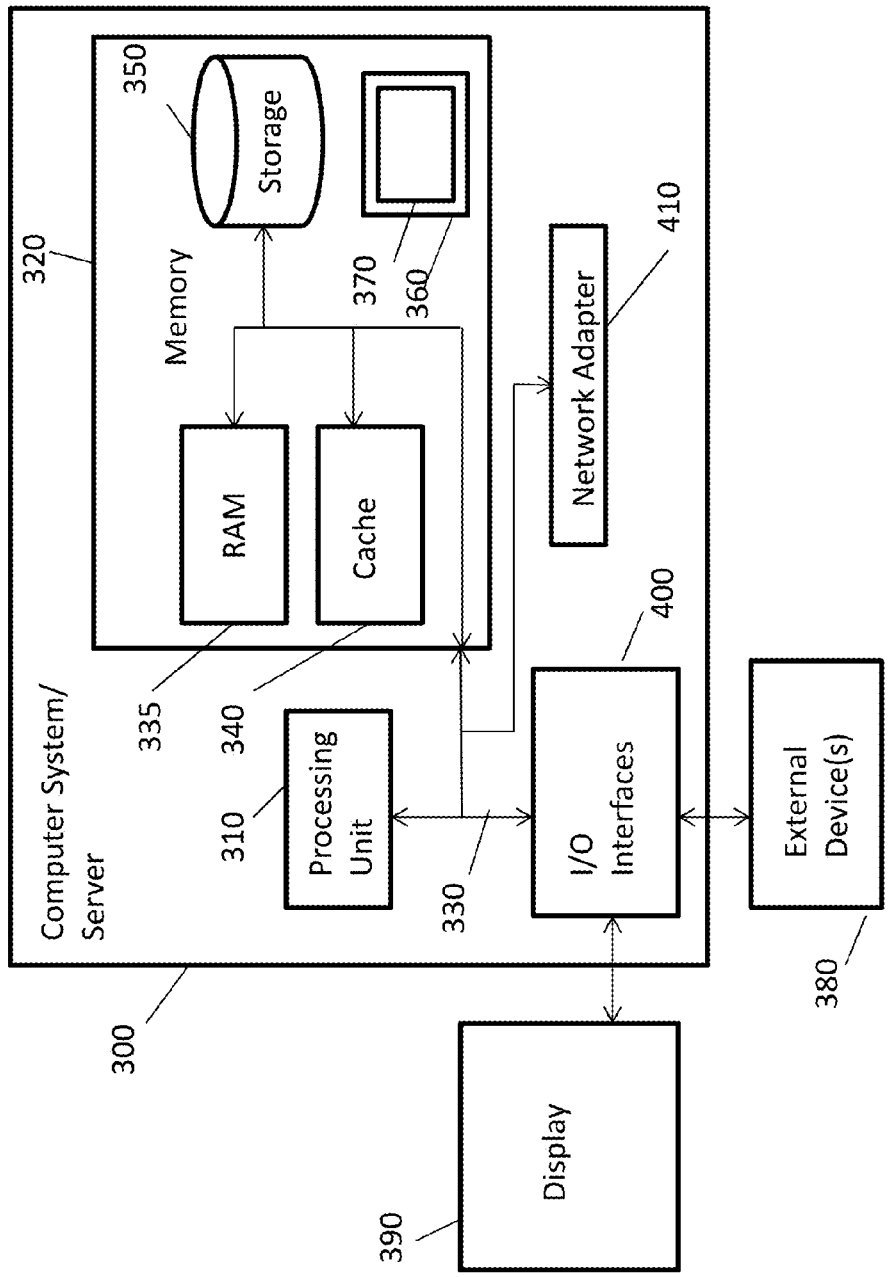
FIG. 2 is a block diagram illustrating an exemplary embodiment of an information processing system.

As may also be seen from FIG. 2, in step 170, a value for the vorticity in the simulated ocean model comprising the initial turbulent flow scheme is calculated by the processor of the computer system. In step 180, when the vorticity of the simulation model exceeds the predetermined threshold value, for example, of 0.0001 rotations per second, a search is conducted by the processor of the computer system to identify search results for other turbulent flow schemes which match the calculated value for the vorticity. The method then proceeds according to the steps described above with regard to FIG. 1.

The computer-implemented method may be used to model any advection-diffusion process, including large-scale advection-diffusion processes. In an embodiment, the advection-diffusion models are ocean models incorporating the initial and new turbulent flow schemes for the advection-diffusion processes. In an embodiment, the advection-diffusion models are atmospheric models incorporating the initial and new turbulent flow schemes for the advection-diffusion processes.

The turbulent flow parameter may include one or more parameters relating to the particular advection-diffusion process of interest. In an embodiment, the turbulent flow parameter comprises rules or sets of rules relating to the turbulent flow parameters being studied. Any turbulent flow parameter relating to a property or feature of the advection-diffusion process being studied may be selected. For example, the turbulent flow parameter may be a physical property of the advection-diffusion process or a descriptive feature of the domain of study. Non-limiting examples of physical properties include flow speed, vorticity, water quality or a combination comprising at least one of the foregoing. Non-limiting examples of descriptive features of the domain of study include descriptive information related to bathymetry, coastline geometry or a combination comprising at least one of the foregoing.

In an embodiment, the computer-implemented method utilizes one or more modules to perform one or more of the steps described above. Non-limiting examples of such modules include, but are not limited to, a calculating module, e.g., an analytics module, and a scoring and/or annotating module, e.g., a decision management module.

The initial turbulent flow scheme may be selected from any number of available turbulent flow schemes. The search for other turbulent flow schemes which match the turbulent flow parameter calculated for the initial turbulent flow scheme may utilize a non-structured searching process, e.g., natural language processing, or structured searching processes in a relational-based database and/or a knowledge-based database, or a combination thereof, to identify matching search results. In an embodiment, natural language processing is used to search literature such as scientific or industrial journal articles to identify matching search results. In another embodiment, natural language processing as well as a relational-based database and a knowledge-based database searching are used to obtain the search results. The predetermined number of matching search results generated may be adjusted as desired. For example, in an embodiment, the search concludes after 100 matching search results are identified.

The search results are rated according to a quantitative rating system which determines the level of information confidence for each search result obtained. The rating may take into account any information related to the information confidence of the information, including, but not limited to, the frequency a particular search result is cited in other search results.

The computer-implemented method allows for the automatic selection and tuning of a simulation model by utilizing structured and/or non-structured searching to identify turbulent flow schemes which better match user inputs. The computer-implemented method validates whether the initial turbulent flow scheme is appropriate, and when a selected parameter exceeds the predetermined threshold, automatically identifies and selects another turbulent flow scheme which matches the calculated parameter value and has been rated a high level of confidence to generate a new turbulent flow scheme for use in the simulation model. The computer-implemented method improves the efficiency of the selection process for selecting an appropriate turbulent flow scheme, making the process less tedious, complex time-consuming, costly and/or subject to user error.

According to another embodiment, a system for modelling turbulent flows in an advection-diffusion process comprises a memory; a processor communicatively coupled to the memory, wherein the processor is configured to perform: calculating a value for a turbulent flow parameter in a simulated model comprising an initial turbulent flow scheme for an advection-diffusion process; determining that the value for the turbulent flow parameter has exceeded a predetermined threshold; conducting a search to identify search results for other turbulent flow schemes which match the value of the turbulent flow parameter; determining a quantified level of information confidence for the search results; annotating the search results with the quantified level of information confidence; and selecting a new turbulent flow scheme corresponding to the search result having the highest quantified level of information confidence.

According to yet another embodiment, a computer program product for modelling turbulent flows in an advection-diffusion process comprises a non-transitory storage medium readable by a processing circuit and storing instructions for execution by the processing circuit for performing a method comprising: calculating a value for a turbulent flow parameter in a simulated model comprising an initial turbulent flow scheme for an advection-diffusion process; determining that the value for the turbulent flow parameter has exceeded a predetermined threshold; conducting a search to identify search results for other turbulent flow schemes which match the value of the turbulent flow parameter; determining a quantified level of information confidence for the search results; annotating the search results with the quantified level of information confidence; and selecting a new turbulent flow scheme corresponding to the search result having the highest quantified level of information confidence.

Referring to FIG. 3, a block diagram illustrating an information processing system is shown. The information processing system 300 is based upon a suitably configured processing system configured to implement one or more embodiments described herein, e.g., the analytics module and the decision management module. Any suitably configured processing system can be used as the information processing system 300 in the embodiments described herein. The components of the information processing system 300 can include, but are not limited to, one or more processors or processing units 310, a system memory 320 and a bus 330 that couples various system components including the system memory 320 to the processor 310.

The bus 330 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture bus, Enhanced ISA bus, Video Electronics Standards Association local bus and Peripheral Component Interconnects bus.

Although not shown in FIG. 3, the system memory 320 may include the calculating, information confidence rating and annotating information software module(s). The system memory 320 can also include computer system readable media in the form of volatile memory, such as random access memory ("RAM") 335 and/or cache memory 340. The information processing system 300 can further include other removable/non-removable, volatile/non-volatile computer system storage media. By way of example only, a storage system 350 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 330 by one or more data media interfaces. The memory 320 can include at least one program product having a set of program modules that are configured to carry out the functions of the embodiment described herein.

Program/utility 360, having a set of program modules 370, may be stored in memory 320 by way of example, and not limitation, as well as an operating system, one or more application programs, other program modules, and program data. Each of the operating system, one or more application programs, other program modules, and program data or some combination thereof, may include an implementation of a networking environment. Program modules 370 generally carry out the functions and/or methodologies of the embodiments described herein.

The information processing system 300 can also communicate with one or more external devices 380 such as a keyboard, a pointing device, a display 390, etc.; one or more devices that enable a user to interact with the information processing system 300; and/or any devices, e.g., network card, modem, etc., that enable computer system/server 300 to communicate with one or more other computing devices. Such communication can occur via I/O interfaces 400. Still yet, the information processing system 300 can communicate with one or more networks such as a local area network, a general wide area network, and/or a public network, e.g., the Internet, via network adapter 410. As depicted, the network adapter 410 communicates with the other components of information processing system 300 via the bus 330. Other hardware and/or software components can also be used in conjunction with the information processing system 300. Examples include, but are not limited to: microcode, device drivers, redundant processing units, external disk drive arrays, RAID systems, tape drives and data archival storage systems.

Certain aspects of the embodiments described herein may be a system, method or computer program product. Accordingly, the embodiments described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of instructions which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modelling turbulent flows in an advection-diffusion process, the method comprising:

calculating, by a processor of a computer system, a value for a turbulent flow parameter in a simulated model comprising initial turbulent flow scheme for an advection-diffusion process;

determining, by the processor of the computer system, that the value for the turbulent flow parameter has exceeded a predetermined threshold;

conducting, by the processor of the computer system, a search to identify search results for other turbulent flow schemes which match the value of the turbulent flow parameter;

determining, by the processor of the computer system, a quantified level of information confidence for the search results;

annotating, by the processor of the computer system, the search results with the quantified level of information confidence; and selecting, by the processor of the computer system, a new turbulent flow scheme corresponding to the search result having the highest quantified level of information confidence.

2. The computer-implemented method of claim 1, further comprising:

selecting, by the processor of the computer system, one or more additional turbulent flow parameters and the initial turbulent flow scheme;

simulating, by the processor of the computer system, a turbulent flow model comprising the initial turbulent flow scheme and the selected one or more additional turbulent flow parameters; and simulating by the processor of a computer system, a model comprising new turbulent flow scheme.

3. The computer-implemented method of claim 1, wherein the search is conducted using natural language processing, a relational-based database, a knowledge-based database or a combination thereof.

4. The computer-implemented method of claim 1, wherein the simulated model comprising the initial turbulent flow scheme for an advection-diffusion process is an ocean model.

5. The computer-implemented method of claim 1, wherein the simulated model comprising the initial turbulent flow scheme for an advection-diffusion process is an atmospheric model.

6. The computer-implemented method of claim 1, wherein the turbulent flow parameter comprises one or more of a flow speed, a vorticity, and a water quality.

7. The computer-implemented method of claim 1, wherein the turbulent flow parameter comprises information related to one or more of bathymetry and coastline geometry.

8. A system for modelling turbulent flows in an advection-diffusion process, the system comprising:
  a memory;
  a processor communicatively coupled to the memory, wherein the processor is configured to perform:
    calculating a value for a turbulent flow parameter in a simulated model comprising an initial turbulent flow scheme for an advection-diffusion process;
    determining that a value for the turbulent flow parameter has exceeded a predetermined threshold;
    conducting a search to identify search results for other turbulent flow schemes which match the value of the turbulent flow parameter;
    determining a quantified level of information confidence for the search results;
    annotating the search results with the quantified level of information confidence; and
    selecting a new turbulent flow scheme corresponding to the search result having the highest quantified level of information confidence.

9. The system of claim 8, wherein the processor is configured to perform:
  selecting one or more additional turbulent flow parameters and the initial turbulent flow scheme;
  simulating a turbulent flow model comprising the initial turbulent flow scheme and the selected one or more additional turbulent flow parameters; and
  simulating a model comprising the new turbulent flow scheme.

10. The system of claim 8, wherein the search is conducted using natural language processing, a relational-based database, a knowledge-based database or a combination thereof.

11. The system of claim 8, wherein the simulated model comprising the initial turbulent flow scheme for an advection-diffusion process is an ocean model.

12. The system of claim 8, wherein the simulated model comprising the initial turbulent flow scheme for an advection-diffusion process is an atmospheric model.

13. The system of claim 8, wherein the turbulent flow parameter comprises one or more of a flow speed, a vorticity and a water quality.

14. The system of claim 8, wherein the turbulent flow parameter comprises information related to one or more of bathymetry and coastline geometry.

15. A computer program product for modelling turbulent flows in an advection-diffusion process, the computer program product comprising:
  a non-transitory storage medium readable by a processing circuit and storing instructions for execution by the processing circuit for performing a method comprising:
    calculating a value for turbulent flow parameter in a simulated model comprising an initial turbulent flow scheme for an advection-diffusion process;
    determining that the value for the turbulent flow parameter has exceeded a predetermined threshold;
    conducting a search to identify search results for other turbulent flow schemes which match the value of the turbulent flow parameter;
    determining a quantified level of information confidence for the search results;
    annotating the search results with the quantified level of information confidence; and
    selecting a new turbulent flow scheme corresponding to the search result having the highest quantified level of information confidence.

16. The computer program product of claim 15, wherein the method further comprises:
  selecting one or more additional turbulent flow parameters and the initial turbulent flow scheme;
  simulating a turbulent flow model comprising the initial turbulent flow scheme and the selected one or more additional turbulent flow parameters; and
  simulating a model comprising the new turbulent flow scheme.

17. The computer program product of claim 15, wherein the method further comprises:
  conducting a relational-based or knowledge-based database search to identify search results which relate the turbulent flow parameter to the turbulent flow scheme.

18. The computer program product of claim 15, wherein the simulated model comprising the initial turbulent flow scheme for an advection-diffusion process is an ocean model.

19. The computer program product of claim 15, wherein the simulated model comprising the initial turbulent flow scheme for an advection-diffusion process is an atmospheric model.

20. The computer program product of claim 15, wherein the turbulent flow parameter comprises one or more of a flow speed, a vorticity and a water quality.

* * * * *